No. 772,565. PATENTED OCT. 18, 1904.
E. B. GILLELAND.
STOCK CAR.
APPLICATION FILED JAN. 30, 1904.
NO MODEL. 5 SHEETS—SHEET 1.
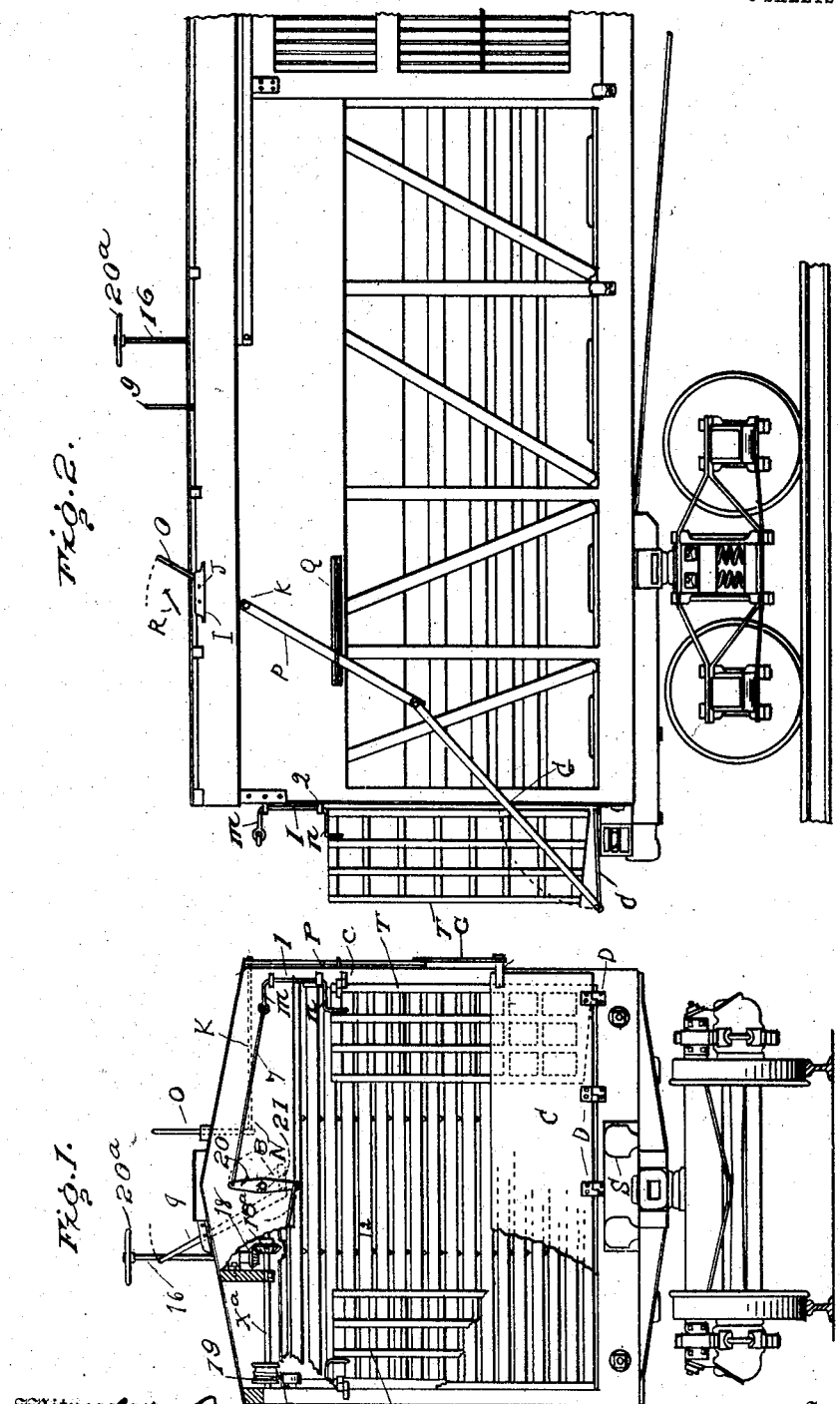

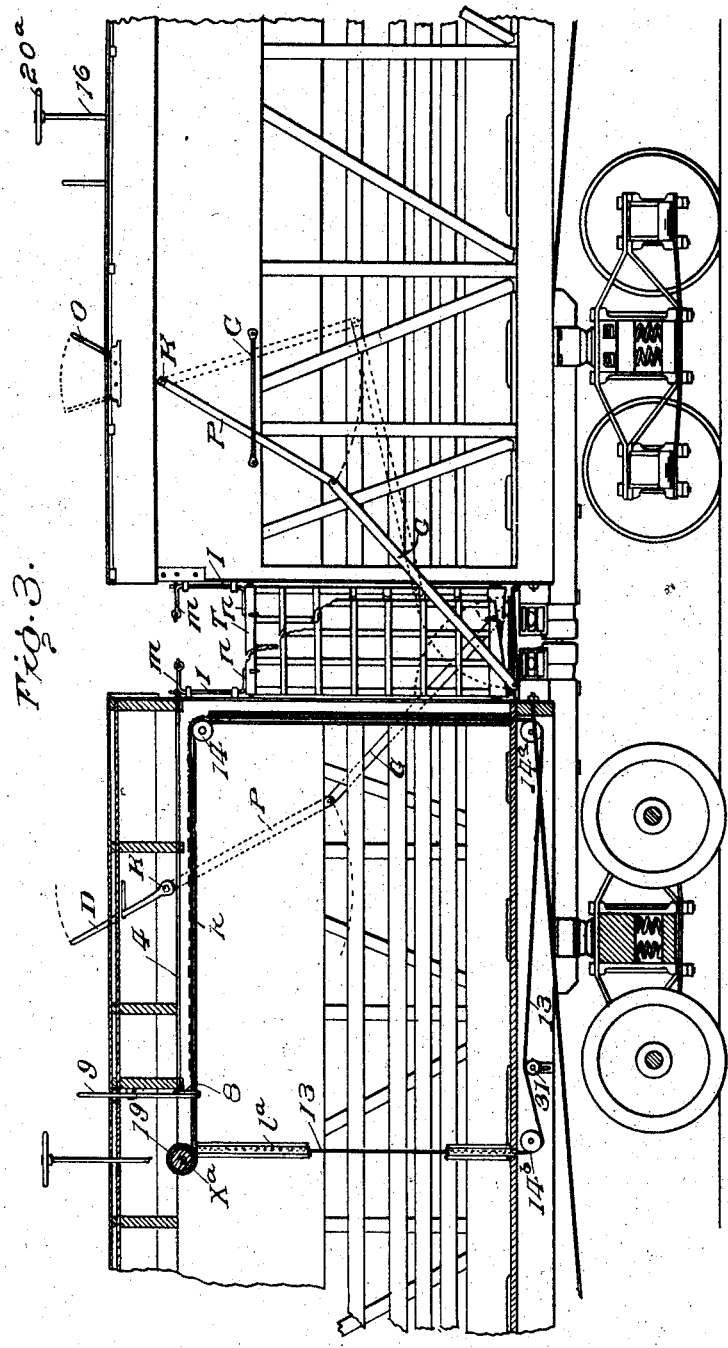

No. 772,565. PATENTED OCT. 18, 1904.
E. B. GILLELAND.
STOCK CAR.
APPLICATION FILED JAN. 30, 1904.
NO MODEL. 5 SHEETS—SHEET 3.
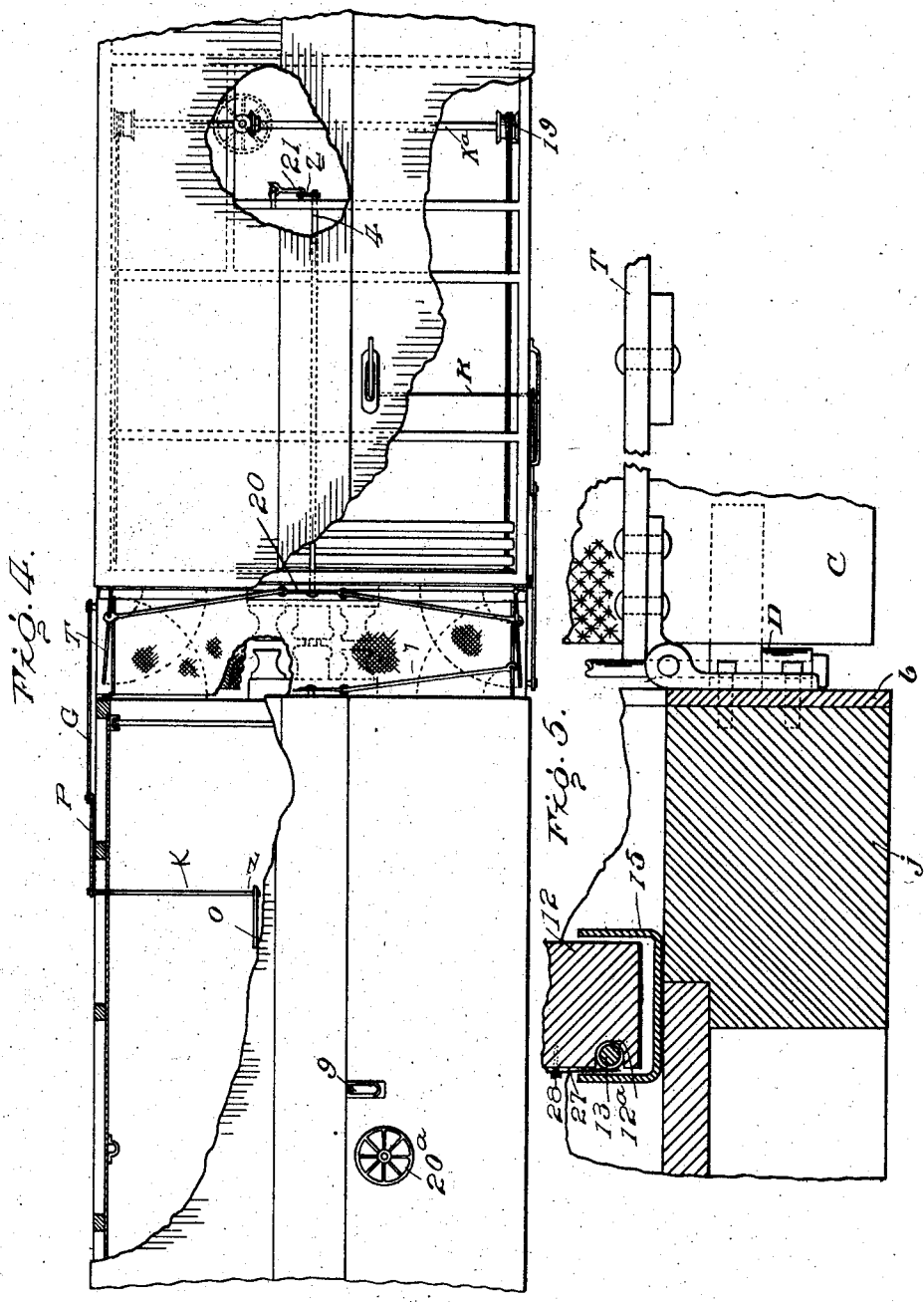
Witnesses: Inventor No. 772,565. PATENTED OCT. 18, 1904.
E. B. GILLELAND.
STOCK CAR.
APPLICATION FILED JAN. 30, 1904.
NO MODEL. 5 SHEETS—SHEET 4.
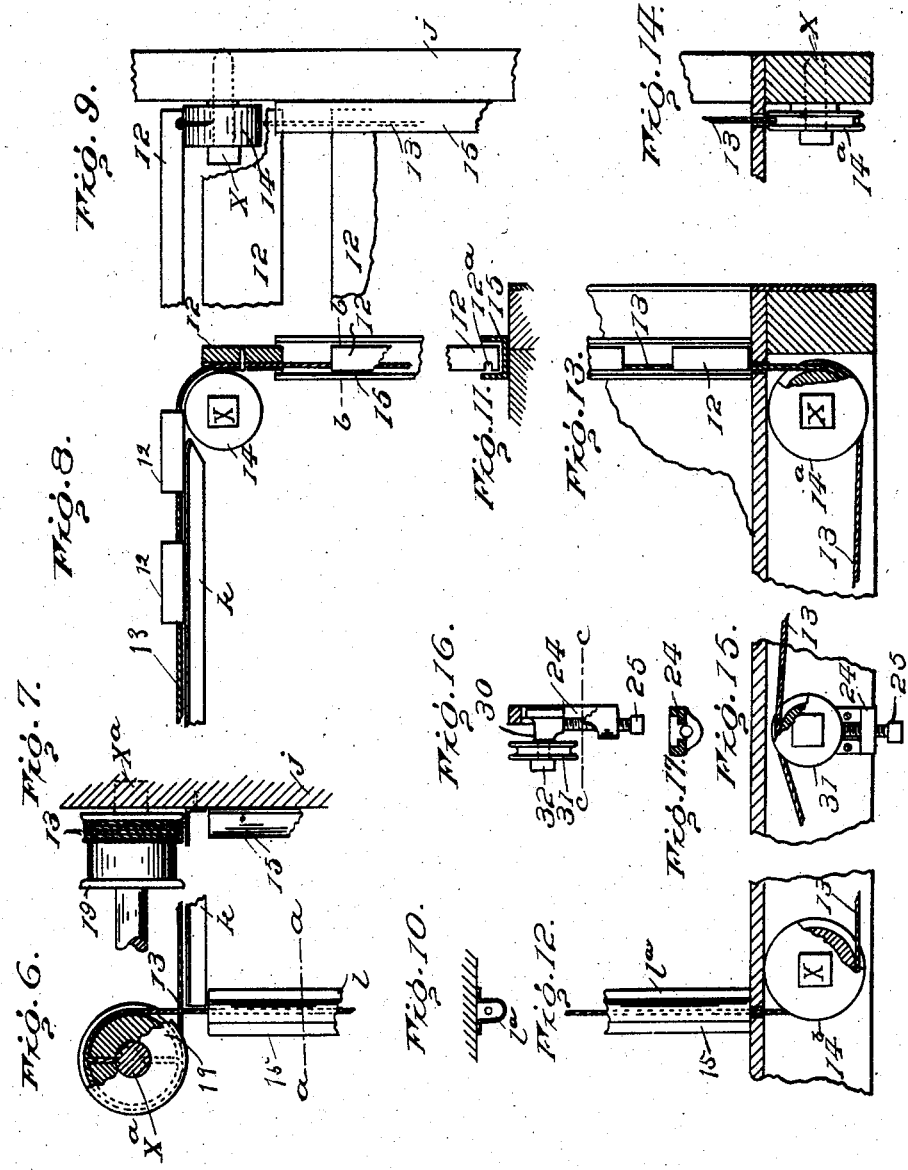
Witnesses:
Inventor
Edgar Beresford Gilleland No. 772,565. PATENTED OCT. 18, 1904.
E. B. GILLELAND.
STOCK CAR.
APPLICATION FILED JAN. 30, 1904.
NO MODEL. 5 SHEETS—SHEET 5.
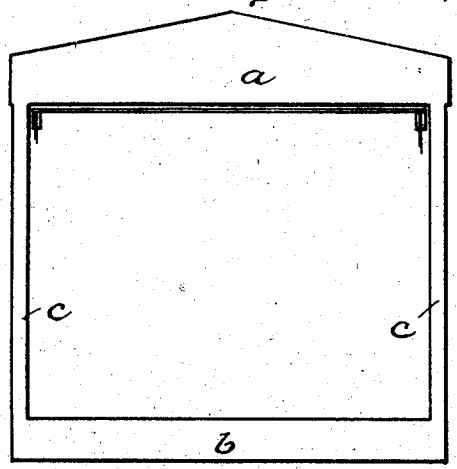
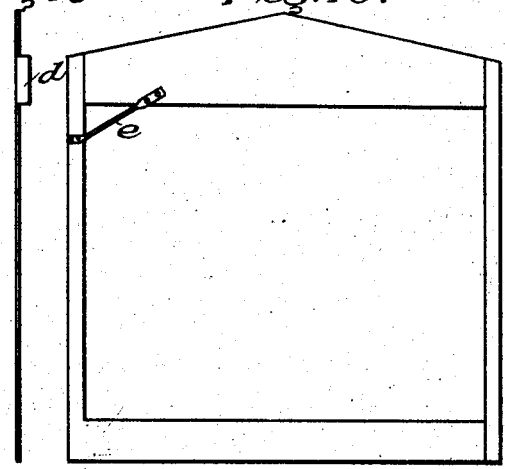
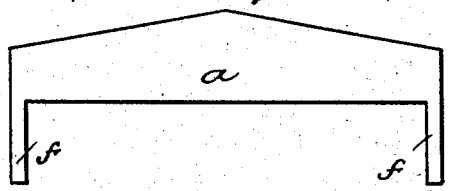
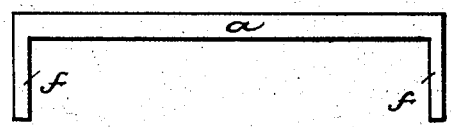
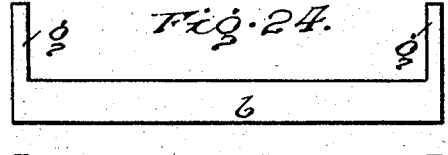
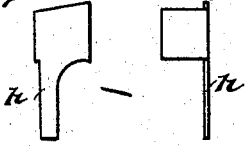
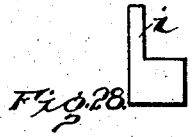
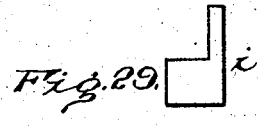
Witnesses
J. A. Davison
Wm. M. Wilson
Inventor
Edgar Bensford Gilleland No. 772,565.                                                                 Patented October 18, 1904.

UNITED STATES PATENT OFFICE.

EDGAR BERESFORD GILLELAND, OF WICHITA, KANSAS, ASSIGNOR OF ONE-HALF TO WILLIAM M. WILSON.

STOCK-CAR.

SPECIFICATION forming part of Letters Patent No. 772,565, dated October 18, 1904.

Application filed January 30, 1904. Serial No. 191,341. (No model.)

*To all whom it may concern:*

Be it known that I, EDGAR BERESFORD GILLELAND, a resident of Wichita, in the county of Sedgwick and State of Kansas, have invented certain new and useful Improvements in Stock-Cars; and I do hereby declare the following to be a full, clear, and exact description of the invention, such as will enable others skilled in the art to which it appertains to make and use the same.

This invention is primarily designed to facilitate the loading and unloading of stock-trains and to obviate the difficulties and loss of time experienced in the shifting of a train to bring each car thereof in position opposite a chute through which the cattle are driven either aboard the car or away therefrom, according as the stock is loading or unloading.

The invention provides means for throwing all the cars of a stock-train into communication, whereby the stock may have a common ingress or egress, the controlling means being manipulated from a convenient point without the car and admitting of isolating the cars as filled or emptied, if desired.

In accordance with this invention the ends of the stock-cars have openings approximating their width or the distance between the side walls of the cars, so an unobstructed passage may be provided between adjacent cars to prevent congestion of the stock at the ends of cars when passing through a train. Flexible doors close the ends of the cars and preferably open upward by a sliding movement.

The invention further contemplates hinged platforms to close the space between adjacent cars and provide a support to carry the animals safely across from one car to the next, said platforms overlapping and resting upon the bumpers when open or turned downward.

The invention also provides guards to close the sides of the space between the cars to prevent the cattle from turning outward when passing from one car to the other, said guards being preferably hinged to swing inward against the doors to be out of the way and to brace said doors against pressure from within.

The invention, furthermore, contemplates and provides novel operating instrumentalities for the doors, platforms, and guards, as well as mountings therefor, together with means for strengthening and reinforcing the ends of the cars to prolong their period of usefulness.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is an end view of a stock-car embodying the invention, parts being broken away. Fig. 2 is a side view of an end portion of the car illustrated in Fig. 1, showing the platform lowered and a side guard extended. Fig. 3 is an elevation of the end portions of adjacent stock-cars embodying the invention coupled, showing the platforms lowered and the side guards extended, one of the cars being in full and the other in longitudinal section. Fig. 4 is a top plan view of the parts shown in Fig. 3, side portions of the roofs being broken away to show more clearly the arrangement of the parts. Fig. 5 is a horizontal section of a corner portion of a car equipped with the invention, showing the parts on a larger scale. Fig. 6 is a detail view of the operating-cable for a flexible door, showing the pulley and guard therefor and a horizontal rail for supporting the flexible door when moved upward and inward. Fig. 7 is a front view of the parts shown in Fig. 6, the horizontal rail being in section. Fig. 8 is a detail view of a portion of a flexible door, showing the vertical guide and the horizontal rail therefor together with the guide-pulley intermediate their adjacent ends. Fig. 9 is a front view of the parts shown in Fig. 8. Fig. 10 is a horizontal section of the guard on the line *a a* of Fig. 6. Fig. 11 is a horizontal section of the vertical guide for the flexible door on the line *b b* of Fig. 8. Fig. 12 is a detail view of the lower rear guide-pulley for the operating-cable of the flexible door. Fig. 13 is a detail view of the lower front guide-pulley, operating-cable, and a portion of the flexible door and vertical guide therefor. Fig. 14 is a front view of a lower guide-pulley and operating-cable. Fig. 15 is a detail view in elevation of the tension device for taking up any slack in the operating-cable. Fig. 16 is an edge view of the tension device shown in Fig. 15, a portion of the frame being broken away. Fig. 17 is a horizontal section of the tension device on the line *c c* of Fig. 16. Fig. 18 is a front view of the reinforcing-frame for bracing the end of the car. Fig. 18$^a$ is an edge view of the reinforcing-frame. Fig. 19 is a view similar to Fig. 18, showing a modification of the reinforcing-frame. Fig. 20 is a front view of the upper member of the reinforcing-frame when constructed of sections. Fig. 21 is a modification of the upper member. Fig. 22 is a front view of a corner-bracket of the reinforcing-frame when composed of sections. Fig. 23 is a modification of the corner-bracket. Fig. 24 is a front view of the lower member of the reinforcing-frame. Fig. 25 is a front view of a further modification of the upper corner-bracket for the reinforcing-frame. Fig. 26 is an edge view of the corner-bracket shown in Fig. 25. Fig. 27 is a top plan view of the corner-brackets shown in Figs. 25 and 26. Fig. 28 is a detail view of the lower left-hand corner-bracket of the sectional form of reinforcing-frame. Fig. 29 is a front view of the lower right-hand corner-bracket.

Corresponding and like parts are referred to in the following description and indicated in all the views of the drawings by the same reference characters.

The car illustrated is of the type commonly employed for transporting live stock and is modified in accordance with this invention so as to have its ends open between the corner-posts or sides, so as not to offer any obstruction to the free passage of the stock from one car to the other. A reinforcing-frame is secured to each end of the car to brace and strengthen the same, this being essential because of the omission of the portions usually employed for closing the ends of the car and staying the same. The reinforcing-frame is illustrated most clearly in Figs. 18 and 19 and is bolted or otherwise securely fastened to the end plate, end sill, and corner-posts of the car. The reinforcing-frame is of substantial construction and is preferably formed of metal and may be integral, as shown in Fig. 18, or composed of parts, as shown in Fig. 19 and Figs. 20 to 29, inclusive. The reinforcing-frame comprises the upper member *a*, lower member *b*, and the side members *c*. The upper edge of the member *a* may be oppositely inclined or it may be flat. Flanges *d* are provided at the ends of the member *a* to embrace the sides of the car, so as to provide a more substantial connection. A brace *e* may be interposed between the members *a* and *c*, as shown most clearly in Fig. 19. The upper member *a* of the reinforcing-frame may be provided with extensions *f*, to which the upper ends of the side members may be bolted or secured. The lower member *b* may be provided with extensions *g*, to which the lower ends of the side members *c* are secured. In the event of the several members of the reinforcing-frame being composed of straight sections corner-brackets are provided for connecting the same, and these brackets may have the form substantially as shown in Figs. 22 to 29, inclusive. The upper corner-brackets are indicated by the reference character *h* and the lower corner-brackets by the reference-letter *i*.

Vertical guides 15 are provided at the sides of the car, adjacent to the plane of the reinforcing-frame, and are attached to the inner sides of the corner-posts *j*. These guides 15 may be of any construction so long as they serve to direct the flexible doors in their vertical movements and hold them in place when closed. In the preferable construction the vertical guides 15 are formed of U-irons arranged with their open sides facing inward, so as to receive the edge portions of the flexible door. It is to be understood that the construction and formation of the guides 15 will depend largely upon the design and pattern of the car to be equipped with the invention. The flexible door is composed of a series of slats 12 and connecting ropes or cables 13, the latter passing over direction-pulleys 14, 14$^a$, and 14$^b$ and attached to pulleys or drums 19, secured to a shaft X$^a$. The slats 12 are formed in one side near each end with a groove 12$^a$ to receive the cable or flexible connection 13, which is attached to the slats in any determined way. As shown in Fig. 5, the plate 27 is secured to the end portion of each slat by means of a fastening 28 and overlaps the groove 12$^a$ and clamps the cable or rope 13 with sufficient force to retain the parts in place. The direction-pulleys 14, 14$^a$, and 14$^b$ are mounted upon journals or headed studs X, let into convenient portions of the car structure. A horizontal rail *k* supports the door when moved so as to uncover the end of the car. The rail *k* may be of any formation and, as shown, consists of an L-bar, one wing being secured to the inner side of the car and the other wing projecting to receive the end portions of the slats 12. The operating-cable 13 extends above the horizontal rail, and a portion is arranged in the plane of the vertical guides 15, and a part extends beneath the bottom of the car and passes around the pulleys 14$^a$ and 14$^b$, and another portion passes vertically from the guide-pulley 14$^b$ to the pulley 19 and is protected by means of a guard 1$^a$, which in the preferable construction consists of a plate crimped between its longitudinal edges to form a housing to receive the cable, said guard being attached to the side of the car by fastenings passed through openings in the edge portions thereof.

The shaft X$^a$ extends transversely of the car and is located a short distance below the roof and sufficiently far from the end of the car to admit of the door sliding rearward upon the rails $k$. A vertical shaft 16 is journaled to the roof of the car and projects above the same and is provided at its upper end with a hand-wheel 20$^a$ and at its lower end with a bevel-gear 18, which is in mesh with a companion bevel gear-wheel 18$^a$, secured to the shaft X$^a$. Upon rotating the shaft 16 either to the right or to the left the door may be opened or closed, as desired.

The operating rope or cable 13 is adapted to have its tension regulated by means of a tightener, the same consisting of a pulley 31, mounted upon a journal 32, carried by a block 30, slidably mounted in a frame 24 and moved by means of a set-screw 25, threaded in an end portion of the frame 24. The cable 13 passes over the pulley 31 and is moved upward by vertical adjustment of said pulley, as will be readily comprehended.

A platform C is provided at each end of the car and is hinged at its lower edge to the end sill, or preferably to the lower member of the reinforcing-frame, as shown at D, so as to close upward against the end door and to swing downward into an approximately horizontal position. In the latter position the platform is supported by means of the bumpers. Obviously the platform may be supported in any manner. For operating the platform the following means have been devised and comprise a rock-shaft K, operating-lever O, arm P, and link G. The rock-shaft K is journaled transversely of the car at a point between the transverse shaft X$^a$ and the end of the car, and the lever O is attached to the inner end of said shaft and the arm P to its outer end. The link G connects the arm P with the outer portion of the platform C. The platform-operating mechanism is arranged upon one side of the car at one end and upon the other side of the car at its opposite end. As a result the operating mechanisms of the platforms at adjacent ends of two cars are at opposite sides, thereby obviating interference of one with the other. The platforms C when lowered into horizontal position overlap, thereby preventing the formation of a space between them when the cars are passing around a curve. A guide Q is attached to a side of the car and confines the arm P and consists of a rod or bar having its end portions offset and apertured to receive suitable fastenings, by means of which the guide is held in place. A plate I is secured to a part of the car and is provided with an opening J to receive a pin R to hold the lever O in one or the other of its extreme positions.

The side guards are indicated at T and are hinged to the corner-posts of the car, preferably by having the hinges attached to the upright members of said reinforcing-frame. The guards T close against the end door and swing outward to a position approximately in line with the side of the car, so as to close the space between the ends of adjacent cars. The guards T may be of any construction and relative height and overlap when swung outward, as indicated most clearly in Fig. 4. A shaft 1 is journaled to the upper portion of the reinforcing-frame about in line with the vertical axis of the guard and is provided at its upper and lower ends with offstanding arms $m$ and $n$, the latter having connection with the guard to cause the shaft and guard to turn in unison. A rod or link 7 connects the upper arm $m$ with one end of a bar 20, secured to the outer end of a longitudinally-disposed shaft 4, located about central of the car and above the plane of the rails $k$. A crank-arm 8 is attached to the inner end of the longitudinal shaft 4 and is connected by link 21 with the lower end of an operating-lever 9, which extends above the roof of the car and is fulcrumed so as to swing in a plane transversely of the car. A movement of the lever 9 simultaneously swings both end guards T either to close or to open them, as may be required.

The cars or a train being equipped with the invention and it being desired to load the same with live stock, the platforms C are lowered, the guards T are swung open, and the end doors move upward and rearward, thereby exposing or opening the ends of the cars throughout the length of the train, while at the same time providing a vestibule between the ends of adjacent cars, so that the stock may pass safely from one car to the other without providing any avenue of escape or obstruction between the cars. The train is moved so as to bring the opening or doorway of one of the cars opposite to the chute, after which the animals may be driven through the chute into the car and through the train into the last car, which when safely filled may be shut off by lowering the end door. In like manner each car may be shut off when filled until all the cars are loaded. For unloading a train of cars embodying the invention the train is run alongside of the chute leading into the yard or pen until the doorway of the selected car is opposite to the chute. After the first car is unloaded communication between it and the next car is established by opening the end doors, the platforms and side guards being previously opened, and after the cattle have been driven from the second car into the first and thence through the chute communication between the second and third cars is established, and so on throughout the train. Obviously all the cars of the train may be in communication at all times, if so desired, thereby allowing the cattle to roam throughout the length of the train.

Having thus described the invention, what is claimed as new is—

1. A stock-car having its end open, and an end frame therefor attached to the end plate, the end sill and the corner-posts of the car, substantially as set forth.

2. A stock-car having its end open to admit of the cattle passing from one car of a train to the other, a platform and side guards attached to the end of the car to form a vestibule between the ends of adjacent cars when coupled, and actuating means for the platform and side guards to admit of their operation from a point without the car to avoid entering or passing between adjacent cars, substantially as specified.

3. A stock-car having its end open, a reinforcing-frame for bracing and strengthening the car and attached to the end thereof, and a platform and side guards connected to said reinforcing-frame and adapted to form a vestibule between the ends of adjacent cars, when coupled, substantially as set forth.

4. In a stock-car, the combination of a flexible door, vertical guides at the sides of the car to direct said door in its movements and prevent displacement thereof, horizontal rails at the sides of the car near the top thereof for supporting the door when open, an operating rope or cable having a portion extended beneath the car, a portion near the top and other portions vertical of the car near the end and a short distance from said end, guide-pulleys for the operating-cable, and an operating-pulley having said cable attached thereto, which, when rotated, admits of the door being opened or closed, substantially as set forth.

5. In combination, a stock-car having its end open, guards hinged at one edge to an end of the car about in line with the sides thereof, an operating-lever, and means connecting the guards to each other and to the said operating-lever for simultaneous actuation, substantially as set forth.

6. In combination, a stock-car having its end open, a flexible door for closing said open end, an operating-cable comprising corresponding upper and lower and front and rear portions, guide-pulleys for said operating-cable, actuating means for positively moving the operating-cable in either direction for opening or closing the door, and a guard for protecting the inner or rear vertical portion of the operating-cable, substantially as set forth.

7. In combination, a stock-car having its end open, a flexible door for closing said end, vertical guides and horizontal rails for said door, guide-pulleys for the operating-cable, a transverse shaft, a pulley secured to said shaft and having the operating-cable passed therearound, a vertical shaft, and gearing between said vertical and transverse shafts, substantially as set forth.

8. In a stock-car having an opening in its end, a platform hinged to an end sill and adapted to swing upward against the end of the car and to open downward to provide a safe support between the ends of adjacent cars, and an operating-lever connected with the said platform to admit of its movement from a point exterior to the car, substantially as specified.

9. In combination, a stock-car having its end open, a reinforcing-frame for bracing and stiffening the same, and a platform hinged to the lower member of the reinforcing-frame and adapted to swing upward against said frame, substantially as described.

10. In combination, a stock-car having an opening in its end, a platform hinged to the car so as to swing upward against the end thereof, a rock-shaft, a lever attached to said rock-shaft, an arm connected to the rock-shaft, and a link connecting said arm with the platform, substantially as set forth.

11. In combination, a stock-car having its end open, guards hinged at one edge to an end of the car about in line with the sides thereof for closing the space between the ends of adjacent cars when coupled to form a vestibule, a platform hinged to the end sill, actuating means for simultaneously operating the guards, and other means for independently operating the platform, substantially as set forth.

12. In combination, a stock-car having its end open, a flexible door for closing the open end, and guards hinged to the sides of the car and adapted to close against the flexible door to brace the same and to open outward to close the space between the ends of adjacent cars to form a vestibule, substantially as set forth.

13. In combination, a stock-car having an open end, swinging side guards to form a vestibule between the ends of adjacent cars, a longitudinal shaft, a bar attached intermediate of its ends to said shaft, connections between opposite ends of said bar and the respective guards, and means for operating said shaft for simultaneously actuating both side guards, substantially as set forth.

14. In combination, a stock-car having an end opening, hinged side guards, shafts in line with the axis of the respective guards and having offstanding arms, a bar pivotally supported between its ends, and connecting means between said offstanding arms and said pivoted bar to admit of simultaneous operation of the side guards, substantially as set forth.

15. In combination, a stock-car having an end opening, a flexible door for closing the end opening, hinged side guards adapted to close against the flexible door, and a hinged platform adapted to close upward against the side guards when closed, substantially as described.

In testimony whereof I have signed this specification in the presence of two subscribing witnesses.

EDGAR BERESFORD GILLELAND.

Witnesses:
J. A. DAVISON,
WM. M. WILSON.